(12) United States Patent
Kim et al.

(10) Patent No.: US 9,240,957 B2
(45) Date of Patent: Jan. 19, 2016

(54) SYSTEM AND METHOD FOR SYMMETRIC SWITCHING FABRICS

(71) Applicant: Dell Products L.P., Round Rock, TX (US)

(72) Inventors: Kwangsuk Kim, San Jose, CA (US); Annie A. Dang, Danville, CA (US); Wanqun Bao, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 324 days.

(21) Appl. No.: 13/863,715

(22) Filed: Apr. 16, 2013

(65) Prior Publication Data

US 2014/0307588 A1     Oct. 16, 2014

(51) Int. Cl.
*H04L 12/933* (2013.01)
*H04L 12/931* (2013.01)
*H04L 12/24* (2006.01)

(52) U.S. Cl.
CPC ............ *H04L 49/10* (2013.01); *H04L 49/1515* (2013.01); *H04L 49/65* (2013.01); *H04L 41/0803* (2013.01); *H04L 41/22* (2013.01)

(58) Field of Classification Search
CPC ........ H04L 45/04; H04L 41/145; H04L 49/15; H04L 41/0686; H04L 43/10; G06F 3/0689
See application file for complete search history.

(56) References Cited

U.S. PATENT DOCUMENTS

| | | | |
|---|---|---|---|
| 6,405,258 B1* | 6/2002 | Erimli et al. | 709/235 |
| 2002/0154606 A1* | 10/2002 | Duncan et al. | 370/256 |
| 2011/0246816 A1* | 10/2011 | Hsieh et al. | 714/4.12 |
| 2012/0250679 A1* | 10/2012 | Judge et al. | 370/359 |

* cited by examiner

*Primary Examiner* — Anez Ebrahim
(74) *Attorney, Agent, or Firm* — Haynes and Boone, LLP

(57) ABSTRACT

A system and method for a symmetric switching fabric includes a first switching tier that includes a plurality of leaf switches, a second switching tier that includes one or more spine switches, and a plurality of interlinks for coupling the leaf switches to the spine switches. Each of the leaf switches includes one or more first ports configured to couple each of the leaf switches to other network devices outside the switching fabric and one or more second ports for coupling each of the leaf switches to each of the spine switches. A ratio of a number of first ports and a number of second ports is selected based on an oversubscription ratio. For each pair of a first switch selected from the leaf switches and a second switch selected from the spine switches, a same number of first interlinks selected from the plurality of interlinks couple the first switch to the second switch.

23 Claims, 4 Drawing Sheets

```
interlink 1,1 (1) = [leaf 1 0/0] <-> [spine 1 0/0]
interlink 1,1 (2) = [leaf 1 0/4] <-> [spine 1 0/4]
interlink 1,1 (3) = [leaf 1 0/8] <-> [spine 1 0/8]
interlink 1,1 (4) = [leaf 1 0/12] <-> [spine 1 0/12]
interlink 1,2 (5) = [leaf 1 0/16] <-> [spine 2 0/0]
interlink 1,2 (6) = [leaf 1 0/20] <-> [spine 2 0/4]
. . .
interlink 6,3 (92) = [leaf 6 0/44] <-> [spine 3 0/92]
interlink 6,4 (93) = [leaf 6 0/48] <-> [spine 4 0/80]
interlink 6,4 (94) = [leaf 6 0/52] <-> [spine 4 0/84]
interlink 6,4 (95) = [leaf 6 0/56] <-> [spine 4 0/88]
interlink 6,4 (96) = [leaf 6 0/60] <-> [spine 4 0/92]
```

SYSTEM AND METHOD FOR SYMMETRIC SWITCHING FABRICS

The present disclosure relates generally to information handling systems, and more particularly to symmetric switching fabrics.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often asked to continuously make forwarding decisions and to update forwarding information as network configurations change.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. As data centers increase in size and complexity the desire for parallelization in a switching fabric between the numerous switches and computing devices that make up the data center can become ever more important. As the use of parallelization increases in the switching fabric, the complexity of the switching fabric also tends to increase making it difficult to design and configure the switching fabric for the data center.

Accordingly, it would be desirable to provide improved switching fabrics for data centers, information handling systems, and other network installations.

SUMMARY

According to one embodiment, an information handing system includes a first switching tier of a switching fabric that includes a plurality of leaf switches, a second switching tier of the switching fabric that includes one or more spine switches, and a plurality of interlinks for coupling the plurality of leaf switches to the one or more spine switches. Each of the plurality of leaf switches includes one or more first ports configured to couple each of the plurality of leaf switches to other network devices outside the switching fabric and one or more second ports for coupling each of the plurality of leaf switches to each of the one or more spine switches using one or more of the plurality of interlinks. A ratio of a number of first ports and a number of second ports is selected based on information associated with an oversubscription ratio. For each pair of a first switch selected from the plurality of leaf switches and a second switch selected from the one or more spine switches, a same number of first interlinks selected from the plurality of interlinks couple the first switch to the second switch.

According to another embodiment, a method of configuring a switching fabric includes determining a number of ports for each of the leaf switches, determining a number of ports for each of the spine switches, determining a number of interlinks selected from the plurality of interlinks supported by each of the leaf switches, determining a number of downlinks and uplinks supported by each of the leaf switches, determining a number of leaf switches, determining a number of spine switches, determining whether the number of interlinks supported by each of the leaf switches is evenly distributable over the spine switches, and adjusting the number of spine switches or the number of interlinks supported by each of the leaf switches when the number of interlinks supported by each of the leaf switches is not evenly distributable over the spine switches.

According to yet another embodiment, a non-transitory machine-readable medium comprising a plurality of machine-readable instructions which when executed by one or more processors are adapted to cause the one or more processors to perform a method that includes determining a number of ports for each of the leaf switches, determining a number of ports for each of the spine switches, determining a number of interlinks selected from the plurality of interlinks supported by each of the leaf switches, determining a number of downlinks and uplinks supported by each of the leaf switches, determining a number of leaf switches, determining a number of spine switches, determining whether the number of interlinks supported by each of the leaf switches is evenly distributable over the spine switches, and adjusting the number of spine switches or the number of interlinks supported by each of the leaf switches when the number of interlinks supported by each of the leaf switches is not evenly distributable over the spine switches.

BRIEF DESCRIPTION OF THE DRAWINGS

FIG. 4 shows a simplified representation of a portion of the cabling in a first switching fabric according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
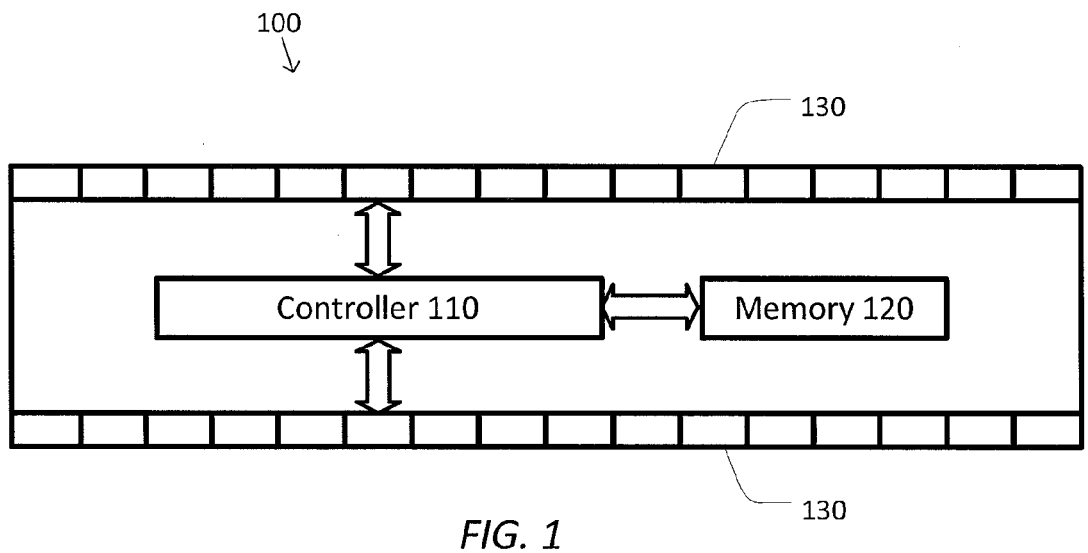
FIG. 1 shows a simplified diagram of a network switching device according to some embodiments.

FIG. 1 shows a simplified diagram of a network switching device 100 according to some embodiments. As shown in FIG. 1, the network switching device or switch 100 includes a controller 110 and memory 120. The controller 110 is coupled to the memory 120 and may control the operation of the switch 100. In some examples, the controller 110 may be used to make forwarding decisions for network traffic being handled by the switch 100. In some examples, the controller 120 may include one or more processors. The switch 100 further includes one or more ports 130 for coupling the switch 100 to other switches and/or network devices using network links (not shown). In some examples, the controller 120 may use one or more protocols to communicate with the other switches and network devices using the one or more ports 130 and network links. The memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, the switch 100 may be selected from a number of types. Two common types of switches used in data centers are chassis-based switches and commodity switches. In some examples, chassis-based switches may be designed around a switching chassis. The switching chassis may include a mid-plane and/or a backplane and provide several slots into which a limited number of line cards containing ports are inserted. In some examples, the chassis-based switches may also include route processing modules designed to provide a switch fabric for interconnecting the line cards. Because the chassis-based switches are developed around the switching chassis they often use proprietary interconnection mechanisms between the line cards, the route processing modules, and the mid-plane or backplane. The use of a switching chassis may further limit the flexibility of the chassis-based switches due to a fixed number of slots in the switching chassis for receiving the line cards. As a consequence, chassis-based switches may not provide adequate flexibility and/or scalability to support a broad range of data centers. Chassis-based switches may also be limited in their ability to adapt to changing network and bandwidth used by the data center.

In contrast, commodity switches may provide a more flexible alternative. In some examples, unlike the chassis-based switches, commodity switches may generally be stand-alone switches. Each commodity switch is a largely self-contained unit that may be interconnected to other switches and network devices using only standardized ports such as the one or more ports 130. Because the commodity switches do not rely on the switching chassis or the route processing modules, the number of commodity switches used in a switching fabric may easily be adapted. This allows the commodity switches to provide better flexibility and scalability to support different data centers and to adapt to the changing bandwidth, etc. of a data center. In some examples, because the commodity switches do not impose any specific interrelationships between each other (in comparison to the interrelationships between line cards, route processor modules, and switching chassis in a chassis-based switch), selection and configuration of a switching fabric implemented using commodity switches may present certain challenges.

Figure 2:
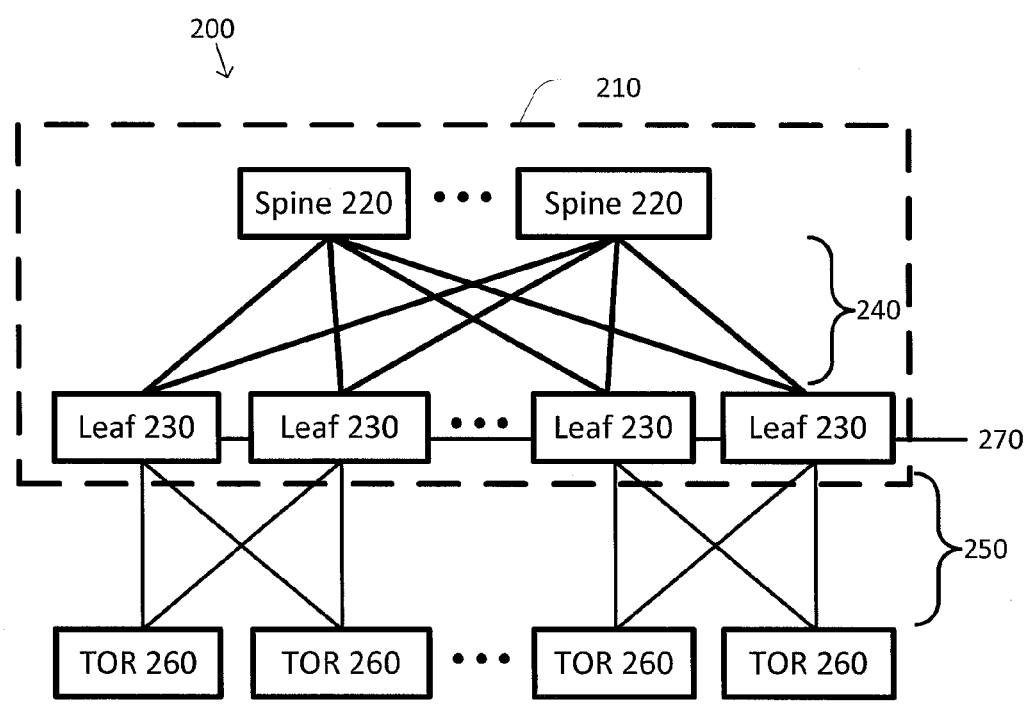
FIG. 2 shows a simplified diagram of a network according to some embodiments.

FIG. 2 shows a simplified diagram of a network 200 according to some embodiments. As shown in FIG. 2, network 200 is configured around a multi-tier architecture that may be suitable for use with many data centers. Network 200 is configured around a two-tier switching fabric 210. Switching fabric 210 includes a plurality of switches to implement the interconnections between other switches and/or network devices in network 200. More specifically, the plurality of switches in switching fabric 210 is separated into switches that perform one of two roles. A first one or more of the switches are spine switches 220 and a second one or more of the switches are leaf switches 230. The spine switches 220 are used to interconnect the leaf switches 230 using a collection of interlinks 240 so that network traffic received at any one of the leaf switches 230 may be forwarded to any other of the leaf switches 230 by traveling through only one of the spine switches 220. As a consequence, network traffic may move between any two leaf switches 230 using at most two hops and can cross the switching fabric 210 using only those two hops. Although only a single interlink 240 is depicted between each of the spine switches 220 and each of the leaf switches 230, one of ordinary skill in the art would understand that there may be multiple interlinks 240 between any pair of spine switches 220 and leaf switches 230. In some examples, the spine switches 220 and the leaf switches 230 may be a same model of switches. In some examples, the spine switches 220 and the leaf switches 230 may be of different models. In some examples, the spine switches 220 and the leaf switches 230 may be commodity switches.

In some examples, the network 200 may use the switching fabric 210 to interconnect other switches and/or network devices that are related to a data center. In some examples, the leaf switches 230 may each include one or more downlinks 250 that couple the leaf switches 230 to one or more switches and/or network devices in the network 200 as depicted by the top-of-rack (TOR) devices 260. Although only TOR devices 260 are shown, it would be understand that the leaf switches 230 may connect to any type of network device that is part of the network 200 or the corresponding data center such as a server. As further shown in FIG. 2, the downlinks 250 may couple each of the TOR devices 260 with multiple leaf switches 230 to provide additional parallelism and redundancy in the network 200. Although only a single downlink 250 is depicted between any pair TOR devices 260 and leaf switches 230, one of ordinary skill in the art would understand that there may be multiple downlinks 250 between any one of the TOR devices 260 and any one of the leaf switches 230. In some examples, each of the leaf switches 230 may further include one or more uplinks 270 that couple the network 200 to network devices in other networks. In some examples, the uplinks 270 may couple the data center and the TOR devices 260 to the other networks. Although only one uplink 270 is depicted, one of ordinary skill in the art would understand that the uplinks 270 may couple the leaf switches 230 to multiple networks and may include more than one uplink connection.

The architecture of the switching fabric 210 is designed to support symmetric and robust communication between and among the TOR devices 260 and between the TOR devices 260 and the other networks. The symmetry of the switching fabric 210 is implemented by providing interlinks 240 between each of the spine switches 220 and each of the leaf switches 230. In some examples, the same number of interlinks 240 may be used between each pair of spine switches 220 and leaf switches 230 so that a same bandwidth capacity may be present between each of the spine switches 220 and each of the leaf switches 230. In some examples, the symmetry may also support load balancing across the network 200 and the switching fabric 210 because any path through the switching fabric 210 supports the same bandwidth as any other path. In some examples, this symmetry combined with the parallel connections between each TOR device 260 and multiple leaf switches 230 may provide the switching fabric 210 with useful redundancy. In some examples, the architecture of the switching fabric 210 may provide a balanced and short route for any network traffic traversing the switching fabric 210 because any network traffic enters and leaves through a single one of the leaf switches 230 or makes two hops from a first leaf switch 230 to a spine switch 220 and then to a second leaf switch 230. In some examples, the architecture of the switching fabric 210 may further support configuration and/or auto-configuration of the switching fabric 210 under various layer 2 and layer 3 protocols. In some examples, the layer 2 and layer 3 protocols, may include virtual router redundancy protocol (VRRP), virtual LAN (VLAN) protocols, virtual link trunking (VLT), and equal cost multi-path routing protocols such as open shortest path first (OSPF).

Figure 3:
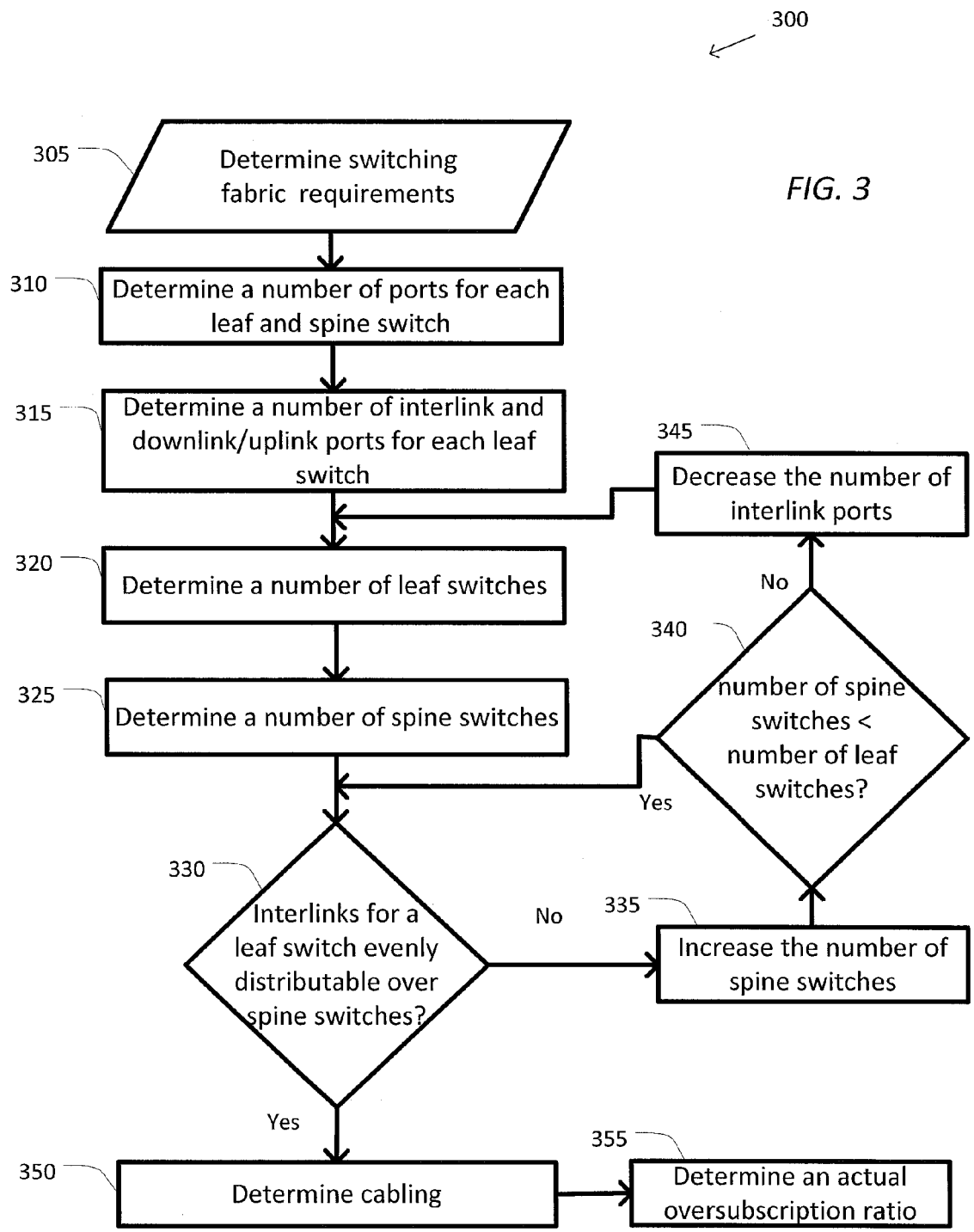
FIG. 3 shows a simplified diagram of a method of symmetric switching fabric specification according to some embodiments.

FIG. 3 shows a simplified diagram of a method 300 of symmetric switching fabric specification according to some embodiments. As shown in FIG. 3, the method 300 includes a process 305 for determining switching fabric requirements, a process 310 for determining a number of ports for each leaf and spine switch, a process 315 for determining a number of interlink and downlink/uplink ports for each leaf switch, a process 320 for determining a number of leaf switches, a process 325 for determining a number of spine switches, a process 330 for determining whether the interlinks for a leaf switch are evenly distributable over the spine switches, a process 335 for increasing the number of spine switches, a process 340 for determining whether the number of spine switches is less than the number of leaf switches, a process 345 for decreasing the number of interlink ports, a process 350 for determining cabling, and a process 355 for determining an actual oversubscription ratio. According to certain embodiments, the method 300 of symmetric switching fabric specification can be performed using variations among the processes 305-355 as would be recognized by one of ordinary skill in the art. In some embodiments, one or more of the processes 350 and 355 are optional and may be omitted. In some embodiments, one or more of the processes 305-355 of method 300 may be implemented, at least in part, in the form of executable code stored on non-transient, tangible, machine readable media that when run by one or more processors (e.g., one or more processors in a workstation or computer) may cause the one or more processors to perform one or more of the processes 305-355.

At the process 305, switching fabric requirements are determined. In some examples, the switching fabric requirements may determine a number and configuration of spine switches and leaf switches associated with the switching fabric that are desired to support network traffic for a data center. In some examples, the switching fabric may be the switching fabric 210. In some examples, the switching fabric requirements may include an oversubscription ratio, downlink and uplink requirements, and switch types. In some examples, the switching fabric requirements may be supplied by a user. In some examples, the switching fabric requirements may be determined from an analysis of networking associated with the data center. In some examples, the switching fabric requirements may be determined from simulation of the data center. In some examples, the switching fabric requirements may be based on current network traffic requirements. In some examples, the switching fabric requirements may be based on anticipated future network traffic requirements.

The oversubscription ratio is a measure of a ratio between a bandwidth allocated to downlinks and uplinks and a bandwidth allocated to interlinks. In some examples, the oversubscription ratio determines how much network traffic the interlinks can handle relative to the downlinks and uplinks. In some examples, a higher oversubscription ratio indicates that the switching fabric may be better able to handle more network traffic that travels through only a single leaf switch than network traffic that travels through a spine switch. In some examples, when the oversubscription ratio is 1:1, the bandwidth allocated to the downlinks and uplinks is the same as the bandwidth allocated to interlinks. In some examples, when the oversubscription ratio is 2:1, the bandwidth allocated to downlinks and uplinks is twice the bandwidth allocated to interlinks. In some examples, the oversubscription ratio may be 1:1, 2:1, 3:1, or 5:1.

The downlink and uplink requirements are a measure of how much network traffic the switching fabric should be able to handle. In some examples, the downlink and uplink requirements may be associated with a bandwidth of downlink and uplink traffic that flows through the switching fabric. In some examples, the downlink and uplink requirements may be associated with a number of downlink and uplink ports used by the switching fabric to support a desired number of downlink and uplink connections to TOR devices, servers, network devices, and/or other networks. In some examples, the downlink and uplink requirements may be specified in terms of a composite value.

The switch types indicate a type and capacity of each of the spine and leaf switches to be used in the switching fabric. In some examples, the switch types may be selected from commodity switches. In some examples, a first switch type may include 32 Ethernet ports with a capacity of 40 gigabits (32×40 GbE ports). In some examples, the first switch type may be a higher capacity switch type. In some examples, a second switch type may include 4×40 GbE ports and 48×10 GbE ports. In some examples, the second switch type may be a lower capacity switch type. In some examples, the 40 GbE ports may be separated into 4×10 GbE ports using cabling. In some examples, ports used for interlinks may not be separated. In some examples, each of the spine switches may be of a same type. In some examples, each of the leaf switches may be of a same type. In some examples, a type of the spine switches and a type of the leaf switches may be the same. In some examples, a type of the spine switches and a type of the leaf switches may be different.

In some examples, a combination of a spine switch type and a leaf switch type may describe a core type of the switching fabric. In some examples, when both the spine switches and the leaf switches are of the higher capacity type, the core type may be large. In some examples, when the spine switches are of the higher capacity type and the leaf switches are of the lower capacity type, the core type may be medium. In some examples, when both the spine switches and the leaf switches are of the lower capacity type, the core type may be small. In some examples, a choice of switching fabric core type may limit the oversubscription ratio.

At the process 310, a number of ports is determined for each leaf and spine switch. Based on the type of the leaf switches, the number of ports for each leaf and spine switch may be determined. In some examples, when all of the ports are of the same capacity, the number of ports is known. In some examples, when the leaf and/or spine switches include ports of different capacities (e.g., the lower capacity switch type), a number of ports may be determined using the lower capacity port size. In some examples, the lower capacity switch type includes an equivalent of 4*4+48*1=64×10 GbE ports. In some examples, when the leaf and/or spine switches include ports that are separable, the number of ports may be determined based on the number of possible separated ports. In some examples, the higher capacity switch type includes 32×40 GbE ports and an equivalent of 4*32=128×10 GbE ports.

At the process 315, a number of interlink and downlink/uplink ports for each leaf switch is determined. Based on the oversubscription ratio and the number of ports for each leaf switch determined during the process 310, the ports of each leaf switch may be divided between interlink ports and downlink/uplink ports. In some examples, when a total number of switch ports is numPorts and the oversubscription ratio is n:1, the number of interlink and downlink/uplink ports for each leaf switch may be determined using Equations 1 and 2, respectively.

$$\text{Interlink ports } (ILP) = \left(\frac{1}{n+1}\right) \text{numPorts} \qquad \text{(Eqn. 1)}$$

$$\text{Downlink/uplink ports } (DLP) = \qquad \text{(Eqn. 2)}$$
$$\left(\frac{n}{n+1}\right) \text{numPorts} = \text{numPorts} - ILP$$

Using the previous example where the oversubscription ratio is 3:1 and the switch type is the higher capacity switch type, the numPorts=128 and the resulting ILP=(¼)*32=32 and DLP=(¾)*128=96. In some examples, the DLP may be rounded up to a nearest even number to support coupling of each TOR device to two leaf switches as shown in FIG. 2. In some examples, when the ILP and the DLP values are to be rounded, the DLP may be rounded up and the ILP rounded down.

At the process 320, a number of leaf switches is determined. Based on the number of downlink/uplink ports per leaf switch (DLP) determined during the process 315 and the downlink and uplink port requirements determined during the process 305, the number of leaf switches for the switching fabric may be determined. In some examples, the number of leaf switches may be determined by dividing the number of downlink and uplink ports by the DLP and rounding up. In some examples, the number of leaf switches may be rounded up to a nearest even number to support the coupling of each TOR device to two leaf switches as shown in FIG. 2. In some examples, when DLP=96 and the number of downlink and uplink ports is 350, the number of leaf switches is 350/96 rounded up, which equals 4.

At the process 325, a number of spine switches is determined. Based on the number of leaf switches determined during the process 320, the number of interlink ports per leaf switch (ILP) determined during the process 315, and the number of ports per spine switch determined during the process 310, the number of spine switches for the switching fabric may be determined. In some examples, the number of spine switches may be determined by dividing the product of the number of leaf switches and ILP by the number of ports per spine switch and rounding up. In some examples, when ILP=32, the number of leaf switches is 4, and the number of ports per spine switch is 128, the number of spine switches is (4*32)/128 rounded up, which equals 1.

At the process 330, it is determined whether the interlinks for a leaf switch are evenly distributable over the spine switches. In order to maintain symmetry in the switching fabric, the interlinks of each of the leaf switches should be evenly shared across all of the spine switches so that each spine switch may handle an even share of the interlink traffic from each of the leaf switches. In some examples, the interlinks for each leaf switch are evenly divisible over the spine switches when the number of interlink ports (ILP) divided by the number of leaf switches is an integer. In some examples, when the interlink ports may not be separated (e.g., for the higher capacity switch type), the division should base ILP on the unseparated number of interlink ports for each leaf switch. In some examples, when ILP=44, the number of spine switches is 2, and the higher capacity switch type is used for the spine switches (i.e., the spine switches have 32×40 GbE, which is equivalent to 1280×10 GbE), the interlinks are evenly distributable (44/2=22) when the interlink ports are separable, but not evenly distributable (44/4=5.5) when the interlink ports are not separable. When the interlinks for a leaf switch are evenly distributable over the spine switches, the method 300 continues at the process 350. When the interlinks for a leaf switch are not evenly distributable over the spine switches, the number of spine switches is increased using the process 335.

At the process 335, the number of spine switches is increased. In some examples, increasing the number of spine switches may allow the interlinks for a leaf switch to be evenly distributable over the increased number of spine switches. In some examples, the number of spine switches is increased by one. In some examples, when the number of leaf switches is two and the interlinks are not evenly distributable over the two spine switches, the number of spine switches may be increased to three.

At the process 340, it is determined whether the number of spine switches is less than the number of leaf switches. In some examples, because the leaf switches split their ports between interlinks and downlinks and uplinks and the spine switches are only used for interlinks, it may only be desirable to include more leaf switches than spine switches in the switching fabric. In some examples, when the number of spine switches equals or exceeds the number of leaf switches, the oversubscription ratio drops below 1:1, which may result in unused bandwidth on the interlinks. When the number of spine switches is less than the number of spine switches, the method 300 returns to the process 330 to determine whether the interlinks for a leaf switch are evenly distributable over the increased number of spine switches determined during the process 335. When the number of spine switches is greater than or equal to the number of leaf switches, the number of interlink ports is decreased using the process 345.

At the process 345, the number of interlink ports is decreased. In some examples, the number of interlink ports for each leaf switch may be decreased to help make the interlinks for a leaf switch evenly distributable over the spine switches. In some examples, decreasing the number of interlink ports results in a corresponding increase in the number of downlink/uplink ports for each leaf switch. In some examples, this reduction in interlinks may increase the oversubscription ratio at the expense of maintaining symmetry in the switching fabric. In some examples, when the interlink ports may not be separated (e.g., for the higher capacity switch type), the number of interlinks per leaf switch should be decreased based on the number of equivalent ports in an unseparated port. In some examples, for the higher capacity switch type, the number of interlink ports per leaf switch should be decreased by 4×10 GbE ports or equivalently 1×40 GbE port. After the number of interlink ports is decreased, the method 300 returns to the process 320 to determine a new number of leaf switches based on the new number of interlink and downlink/uplink ports per leaf switch.

At the optional process 350, the cabling may be determined. Once the number of leaf switches, spine switches, and interlink ports are determined to allow for symmetry in the switching fabric, the cabling between the leaf switches and the spine switches may be determined. In some examples, each leaf switch may be assigned an equal number of ports on each spine switch for the interlinks between them. In some examples, the cabling may be determined to systematically couple the leaf switches and the spine switches to make the cabling orderly. In some examples, when there are n leaf switches and m interlinks between an ith leaf switch and a jth spine switches, the (j−1)*m through j*m−1 ports on the ith leaf switch may be respectively cabled to the (i−1)*m through i*m−1 ports on the jth spine switch.

At the optional process 355, an actual oversubscription ratio may be determined. Once the number of interlink ports and downlink/uplink ports for each leaf switch are determined to allow for symmetry in the switching fabric, the actual oversubscription ratio of the switching fabric may be determined using the ratio of downlink/uplink ports to interlink ports. In some examples, the actual oversubscription ratio may be used to evaluate a quality of the switching fabric configuration.

As discussed above and further emphasized here, FIG. 3 is merely an example which should not unduly limit the scope of the claims. One of ordinary skill in the art would recognize many variations, alternatives, and modifications. In some embodiments, the method 300 may be applied using multiple sets of switching fabric requirements. In some examples, a first application of the method 300 may be used to determine a network configuration based on current network traffic patterns and a second application of the method may be used to determine a network configuration based on projected future network traffic patterns. In some examples, a switching fabric design may be compared against both current and future network traffic requirements to determine whether the switching fabric design for the current network traffic requirements may scale to the future network traffic requirements.

In some embodiments, other core and/or switching types may be used with the method 300. In some examples, other switches than the lower capacity type and the higher capacity type may be used to configure a switching fabric. In some examples, other core type using different combinations of the lower capacity type switches, the higher capacity type switches, and the other switches may be used to configure the switching fabric.

Application of the method 300 will be further demonstrated using several examples.

In a first example, the method 300 may be used to configure a first switching fabric based on the switching fabric characteristics shown in Table 1.

TABLE 1

Characteristics of the First Switching Fabric

| Characteristic | Desired Value |
| --- | --- |
| Core Type | Large |
| Oversubscription Ratio | 1:1 |
| Number of Downlink/uplink ports | 300 |

During the process 310, based on the core type of large, it is determined that both leaf switches and spine switches are of the higher capacity type and include 32×40 GbE ports or equivalently 128×10 GbE ports. During the process 315, the oversubscription ratio of 1:1 and Equations 1 and 2 are used to determine that (½)*128=64=ILP of the equivalent 10 GbE ports are for interlinks and (½)*128=64=DLP of the equivalent 10 GbE ports are for downlinks and uplinks. Because ILP and DLP are even numbers, no further rounding is necessary. During the process 320, a number of leaf switches is determined to be 6 by dividing the 300 downlink/uplink ports by DLP=64 and rounding up to the nearest even number. During the process 325, a number of spine switches is determined to be 3 by dividing the product of the 6 leaf switches and ILP=64 by 128, the number of ports per spine switch, and rounding up. During a first application of the process 330, it is determined that the number of interlink ports per leaf switch (64) is not evenly divisible by the number of spine switches (3). As a result, during the process 335, the number of spine switches is increased to 4, which is determined to still be less than the number of leaf switches (6) during the process 340. During a second application of the process 330, it is determined that the number of interlink ports per leaf switch (64) is now evenly divisible by the increased number of spine switches (4). A consistent result is also obtained when the interlink ports are not separable because 16 interlink ports per leaf switch (64/4) is also evenly divisible by the 4 spine switches. Configuration for a symmetric first switching fabric has now been achieved. During the process 350, cabling is determined by systematically cabling 4×40 GbE or 16×10 GbE ports between each pair of the 6 leaf switches and the 4 spine switches.

FIG. 4 shows a simplified representation of a portion of the cabling 400 in the first switching fabric according to some embodiments. As shown in FIG. 4, the first 0th-15th ports, in 4 port (inseparable) increments, of a first leaf switch (from the 6 leaf switches) are respectively cabled to the 0th-15th ports, in 4 port (inseparable) increments, of the first spine switch (from the 4 spine switches). The 16th-31st ports of the first leaf switch are respectively cabled to the 0th-15th ports of a second spine switch. The cabling continues systematically until the 48th-63rd ports of a sixth leaf switch are respectively cabled to the 80th-95th ports of a fourth spine switch. Although not all the cabling is shown in FIG. 5, any remaining cabling follows the same systematic assignment process.

During the process 355, an actual oversubscription ratio is determined to be 1:1 because each leaf switch uses 64 ports for downlinks and uplinks and 64 ports for interlinks.

Figure 5:
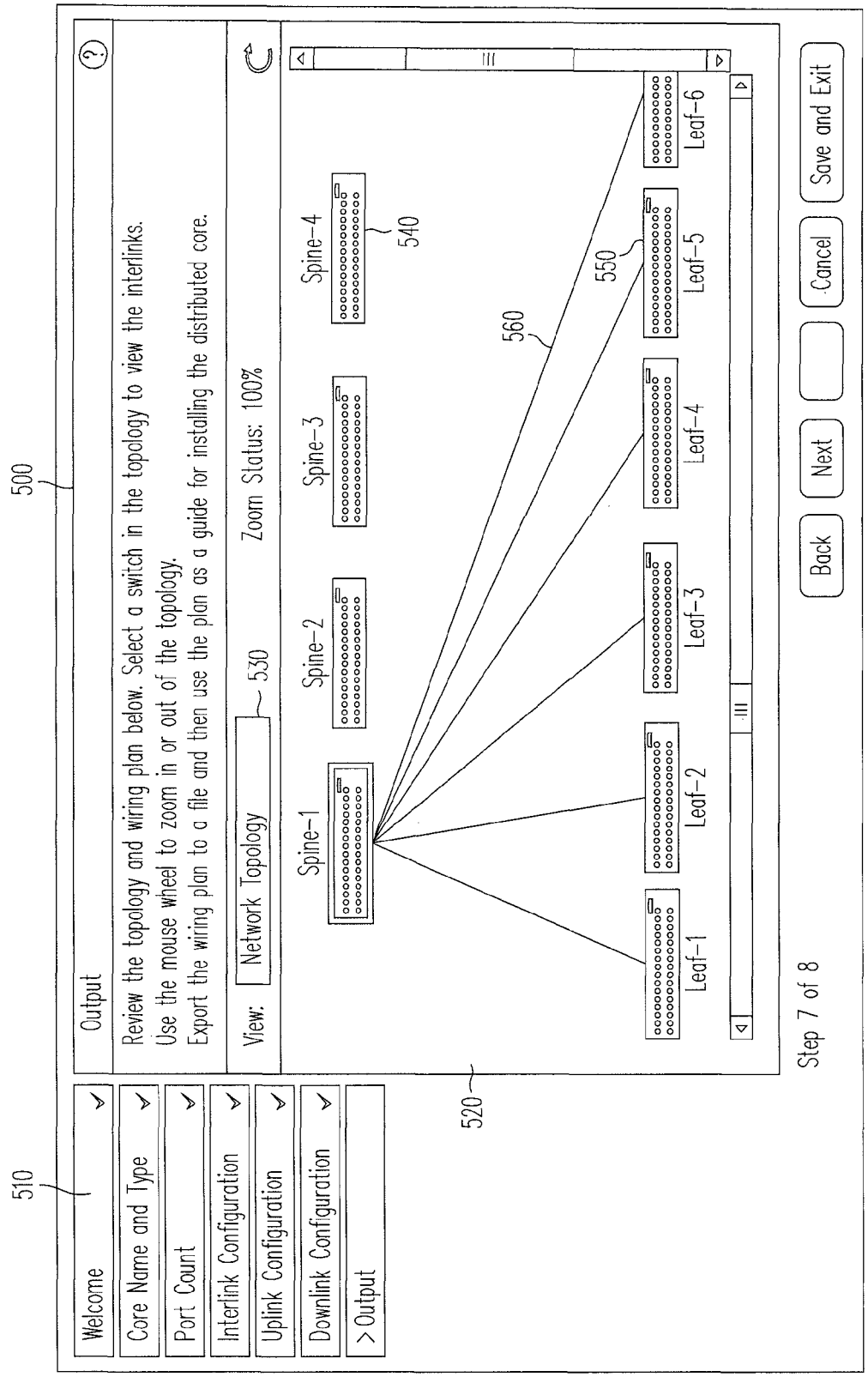
FIG. 5 is a simplified diagram of a user interface for a configuration tool implementing the method of FIG. 3 according to some embodiments.

FIG. 5 is a simplified diagram of a user interface 500 for a configuration tool implementing the method 300 of FIG. 3 according to some embodiments. As shown in FIG. 5, the user interface 500 includes a graphical user interface with several sub-windows or panes. In some examples, a status pane 510 may be used to track the method 300 as it is applied. A results pane 520 includes a graphical display of one or more aspects of a configuration of a switching fabric. In some examples, the results pane 520 may include a view selection control 530 for selecting a desired view of the configuration. In some examples, when the view selection control 530 is used to view a network topology, the results pane 520 may display the topology of the switching fabric. As shown in FIG. 5, the results pane 520 may display the topology for the first switching fabric including the four spine switches 540, the six leaf switches 550, and a portion of the cabling 560 between the first spine switch and the six leaf switches. In some examples, the view selection control 530 may be used to display cabling, such as the cabling 400 shown in FIG. 4. In some examples, during the process 305 for determining switching fabric characteristics, the results pane 520 may include various input boxes and controls to allow a user to specify the switching fabric characteristics. Although only a portion of the user interface 500 is shown, one of ordinary skill in the art would understand that other views are possible and the depiction of the switching fabric configuration may use other similar and/or equivalent arrangements.

In a second example, the method 300 may be used to configure a second switching fabric based on the switching fabric characteristics shown in Table 2.

TABLE 2

Characteristics of the Second Switching Fabric

| Characteristic | Desired Value |
|---|---|
| Core Type | Large |
| Oversubscription Ratio | 2:1 |
| Number of Downlink/uplink ports | 304 |

During the process 310, based on the core type of large, it is determined that both leaf switches and spine switches are of the higher capacity type and include 32×40 GbE ports or equivalently 128×10 GbE ports. During the process 315, the oversubscription ratio of 2:1 and Equations 1 and 2 are used to determine that (⅓*128=42.667=ILP of the equivalent 10 GbE ports are for interlinks and (⅔)*128=55.33=DLP of the equivalent 10 GbE ports are for downlinks and uplinks. Because ILP and DLP are not even numbers, the DLP is rounded up to 86 and the ILP rounded down to 42, which are both even numbers. During a first application of the process 320, a number of leaf switches is determined to be 4 by dividing the 304 downlink/uplink ports by DLP=86 and rounding up to the nearest even number. During a first application of the process 325, a number of spine switches is determined to be 2 by dividing the product of the 4 leaf switches and ILP=42 by 128, the number of ports per spine switch, and rounding up. During a first application of the process 330, it is determined that the number of interlink ports per leaf switch (42) is not evenly divisible by the number of spine switches (2) when the interlink ports are not separable. As a result, during a first application of the process 335, the number of spine switches is increased to 3, which is determined to still be less than the number of leaf switches (4) during a first application of the process 340. During a second application of the process 330, it is determined that the number of interlink ports per leaf switch (42) is still not evenly divisible by the increased number of spine switches (3) when the interlink ports are not separable. As a result, during a second application of the process 335, the number of spine switches is increased again to 4, which is determined to no longer be less than the number of leaf switches (4) during a second application of the process 340. As a result, the number of interlink ports per leaf switch ILP is reduced by 2 to 40 during the process 345, which results in the number of downlink/uplink ports per leaf switch DLP being increased to 88. During a second application of the process 320, a number of leaf switches is determined to be 4 by dividing the 304 downlink/uplink ports by DLP=88 and rounding up to the nearest even number. Because this is an even number, no further rounding is necessary. During a second application of the process 325, a number of spine switches is determined to be 2 by dividing the product of the 4 leaf switches and ILP=40 by 128, the number of ports per spine switch and rounding up. During a third application of the process 330, it is determined that the number of interlink ports per leaf switch (40) is evenly divisible by the number of spine switches (2) when the interlink ports are not separable. During the process 350, cabling is determined by systematically cabling 5×40 GbE or 20×10 GbE ports between each pair of the 4 leaf switches and the 2 spine switches. During the process 355, an actual oversubscription ratio is determined to be 2.2:1 because each leaf switch uses 88 ports for downlinks and uplinks and 40 ports for interlinks.

Some embodiments of process 300 may be implemented using non-transient, tangible, machine readable media that include executable code that when run by one or more processors may cause the one or more processors to perform the processes of method 300 as described above. Some common forms of machine readable media that may include the embodiments of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An information handing system comprising:
a first switching tier of a switching fabric comprising a plurality of leaf switches;
a second switching tier of the switching fabric comprising one or more spine switches; and
a plurality of interlinks for coupling the plurality of leaf switches to the one or more spine switches;
wherein each of the plurality of leaf switches comprises:
one or more first ports configured to couple each of the plurality of leaf switches to other network devices outside the switching fabric; and
one or more second ports for coupling each of the plurality of leaf switches to each of the one or more spine switches using one or more of the plurality of interlinks; wherein:
a ratio of a number of first ports and a number of second ports is selected based on information associated with an oversubscription ratio;
for each pair of a first switch selected from the plurality of leaf switches and a second switch selected from the one or more spine switches, a same number of first interlinks selected from the plurality of interlinks couple the first switch to the second switch; and
a number of leaf switches equals a number of downlinks and uplinks desired for the switching fabric divided by a number of first ports for each of the leaf switches rounded up.

2. The system of claim 1 wherein a number of spine switches is less than a number of leaf switches.

3. The system of claim 1 wherein a number of leaf switches is based on a total number of downlinks and uplinks supported by the switching fabric, a type of each of the leaf switches, and the oversubscription ratio.

4. The system of claim 3 wherein the number of leaf switches is even.

5. The system of claim 3 wherein a number of spine switches is based on the number of leaf switches, the number of second ports, and a type of the spine switches.

6. The system of claim 5 wherein the number of second ports is evenly divisible by the number of spine switches.

7. The system of claim 1 wherein the number of first ports is even.

8. The system of claim 1 wherein each of the leaf switches and each of the spine switches is a commodity switch.

9. The system of claim 1 wherein each of the leaf switches is of a first switch type and each of the spine switches is of a second switch type.

10. The system of claim 9 wherein the first switch type and the second switch type are the same.

11. The system of claim 1 wherein at least two leaf switches selected from the plurality of leaf switches are configured to be coupled to any of the other network devices coupled to the switching fabric using a downlink.

12. The system of claim 1 wherein the number of leaf switches is rounded up to a nearest even number.

13. A method of configuring a switching fabric, the method comprising:
determining one or more characteristics of a switching fabric including a number of downlinks and uplinks desired for the switching fabric, the switching fabric including a first switching tier comprising a plurality of leaf switches, a second switching tier comprising one or more spine switches, and a plurality of interlinks for coupling the plurality of leaf switches to the one or more spine switches;
determining a number of ports for each of the leaf switches;
determining a number of ports for each of the spine switches;
determining a number of interlinks selected from the plurality of interlinks supported by each of the leaf switches;
determining a number of downlinks and uplinks supported by each of the leaf switches;
determining a number of leaf switches by dividing the number of downlinks and uplinks desired for the switching fabric by the number of downlinks and uplinks supported by each of the leaf switches and rounding up;
determining a number of spine switches;
determining whether the number of interlinks supported by each of the leaf switches is evenly distributable over the spine switches; and
adjusting the number of spine switches or the number of interlinks supported by each of the leaf switches when the number of interlinks supported by each of the leaf switches is not evenly distributable over the spine switches.

14. The method of claim 13 wherein the one or more characteristics further include a first type of the plurality of leaf switches, a second type of the one or more spine switches, and an oversubscription ratio.

15. The method of claim 14 wherein determining the number of ports for each of the leaf switches is based on information associated with the first type and determining the number of ports for each of the spine switches is based on information associated with the second type.

16. The method of claim 14 wherein determining the number of interlinks and the number of downlinks and uplinks supported by each of the leaf switches is based on information associated with the number of ports for each of the leaf switches and the oversubscription ratio.

17. The method of claim 13 wherein rounding up comprises rounding up to a nearest even number.

18. The method of claim 13 wherein determining the number of spine switches comprises dividing a product of the number of interlinks supported by each of the leaf switches and the number of leaf switches by the number of ports for each of the spine switches and rounding up.

19. The method of claim 13 wherein determining whether the number of interlinks supported by each of the leaf switches is evenly distributable over the spine switches comprises dividing the number of interlinks supported by each of the leaf switches by the number of spine switches.

20. The method of claim 13 wherein adjusting the number of spine switches or the number of interlinks supported by each of the leaf switches when the number of interlinks supported by each of the leaf switches is not evenly distributable over the spine switches comprises:
increasing the number of spine switches by one;
determining whether the number of spine switches is less than the number of leaf switches; and
decreasing the number of interlinks supported by each of the leaf switches when the number of spine switches is not less than the number of leaf switches and redetermining the number of downlinks and uplinks supported by each of the leaf switches, the number of leaf switches, and the number of spine switches.

21. The method of claim 13 further comprising determining cabling for the plurality of interlinks so that each pair of a first switch selected from the plurality of leaf switches and a second switch selected from the one or more spine switches includes a same number of interlinks selected from the plurality of interlinks between them.

22. The method of claim 13 further comprising determining an actual oversubscription ratio for the switching fabric based on a ratio of the number of interlinks supported by each of the leaf switches and the number of downlinks and uplinks supported by each of the leaf switches.

23. A non-transitory machine-readable medium comprising a plurality of machine-readable instructions which when executed by one or more processors are adapted to cause the one or more processors to perform a method comprising:

determining one or more characteristics of a switching fabric including a number of downlinks and uplinks desired for the switching fabric, the switching fabric including a first switching tier comprising a plurality of leaf switches, a second switching tier comprising one or more spine switches, and a plurality of interlinks for coupling the plurality of leaf switches to the one or more spine switches;

determining a number of ports for each of the leaf switches;

determining a number of ports for each of the spine switches;

determining a number of interlinks selected from the plurality of interlinks supported by each of the leaf switches;

determining a number of downlinks and uplinks supported by each of the leaf switches;

determining a number of leaf switches by dividing a number of downlinks and uplinks desired for the switching fabric by the number of downlinks and uplinks supported by each of the leaf switches and rounding up;

determining a number of spine switches;

determining whether the number of interlinks supported by each of the leaf switches is evenly distributable over the spine switches; and adjusting the number of spine switches or the number of interlinks supported by each of the leaf switches when the number of interlinks supported by each of the leaf switches is not evenly distributable over the spine switches.

\* \* \* \* \*